US012743198B2

(12) United States Patent
Baughman et al.

(10) Patent No.: US 12,743,198 B2
(45) Date of Patent: Sep. 22, 2026

(54) MINIMIZING COGNITIVE OVERLOAD USING DYNAMIC INTERACTION ENVIRONMENT ADJUSTMENT

(71) Applicant: International Business Machines Corporation, Armonk, NY (US)

(72) Inventors: Aaron K. Baughman, Cary, NC (US); Sarbajit K. Rakshit, Kolkata (IN); Kavitha Hassan Yogaraj, Bangalore (IN); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/195,651

(22) Filed: May 10, 2023

(65) Prior Publication Data

US 2024/0377938 A1 Nov. 14, 2024

(51) Int. Cl.
*G06F 3/04847* (2022.01)
*G06Q 10/0631* (2023.01)

(52) U.S. Cl.
CPC . *G06F 3/04847* (2013.01); *G06Q 10/063114* (2013.01)

(58) Field of Classification Search
None
See application file for complete search history.

(56) References Cited

U.S. PATENT DOCUMENTS 9,338,200 B2 5/2016 Park et al.
9,808,722 B2 11/2017 Kawachiya et al.
11,071,496 B2 7/2021 Abrahami et al.
2005/0091364 A1 4/2005 Bantz et al.
2007/0185697 A1* 8/2007 Tan .......................... A61B 5/16 703/11
2015/0221247 A1 8/2015 Herger et al.
2016/0147425 A1 5/2016 Baughman et al.
2017/0003861 A1 1/2017 Kim et al.
2019/0216392 A1 7/2019 Bower et al.
2023/0140125 A1* 5/2023 Glesinger ................ G06N 3/08 704/9

(Continued)

FOREIGN PATENT DOCUMENTS

CN 113246994 A 8/2021
CN 108780357 B 11/2021

OTHER PUBLICATIONS ip.com, Method and System for Improving Accessibility to Online Virtual Worlds, Jun. 21, 2010.

(Continued)

*Primary Examiner* — Gabriel Mercado

(57) ABSTRACT

From data of a first interaction environment, user activity data while using the first interaction environment, and user biometric data while using the first interaction environment, a first cognitive load index is generated. A first directed acyclic graph corresponding to the first cognitive load index is generated. Using a graph convolutional network, the first directed acyclic graph, and a second directed acyclic graph generated from a second cognitive load index, a set of cognitive overload causation factors is generated. Using the set of cognitive overload causation factors, the first interaction environment is adjusted.

20 Claims, 5 Drawing Sheets

(56) References Cited

U.S. PATENT DOCUMENTS

2023/0273682 A1* 8/2023 Wei ........................ A61B 5/165
345/8

OTHER PUBLICATIONS ip.com, Method and System for Proactively Restoring Required Attention Level and Cognitive State While Navigating Target VR Content, Mar. 23, 2021.
Talking Healthtech, Cognitive Overload, Mar. 21, 2021, https://www.talkinghealthtech.com/glossary/cognitive-overload.
torres.ai, A gentle introduction to Deep Reinforcement Learning, May 15, 2020, https://towardsdatascience.com/drl-01-a-gentle-introduction-to-deep-reinforcement-learning-405b79866bf4.
Lopez-Paz et al., The Randomized Causation Coefficient, Journal of Machine Learning Research 16, pp. 2901-2907, Jan. 1, 2015.
Duan et al., Metaverse for Social Good: A University Campus Prototype, MM '21: Proceedings of the 29th ACM International Conference on Multimedia, pp. 153-161, Oct. 17, 2021.
Ware, Perceiving complex causation through interaction, CAE '13: Proceedings of the Symposium on Computational Aesthetics, pp. 29-35, Jul. 19, 2013.

* cited by examiner

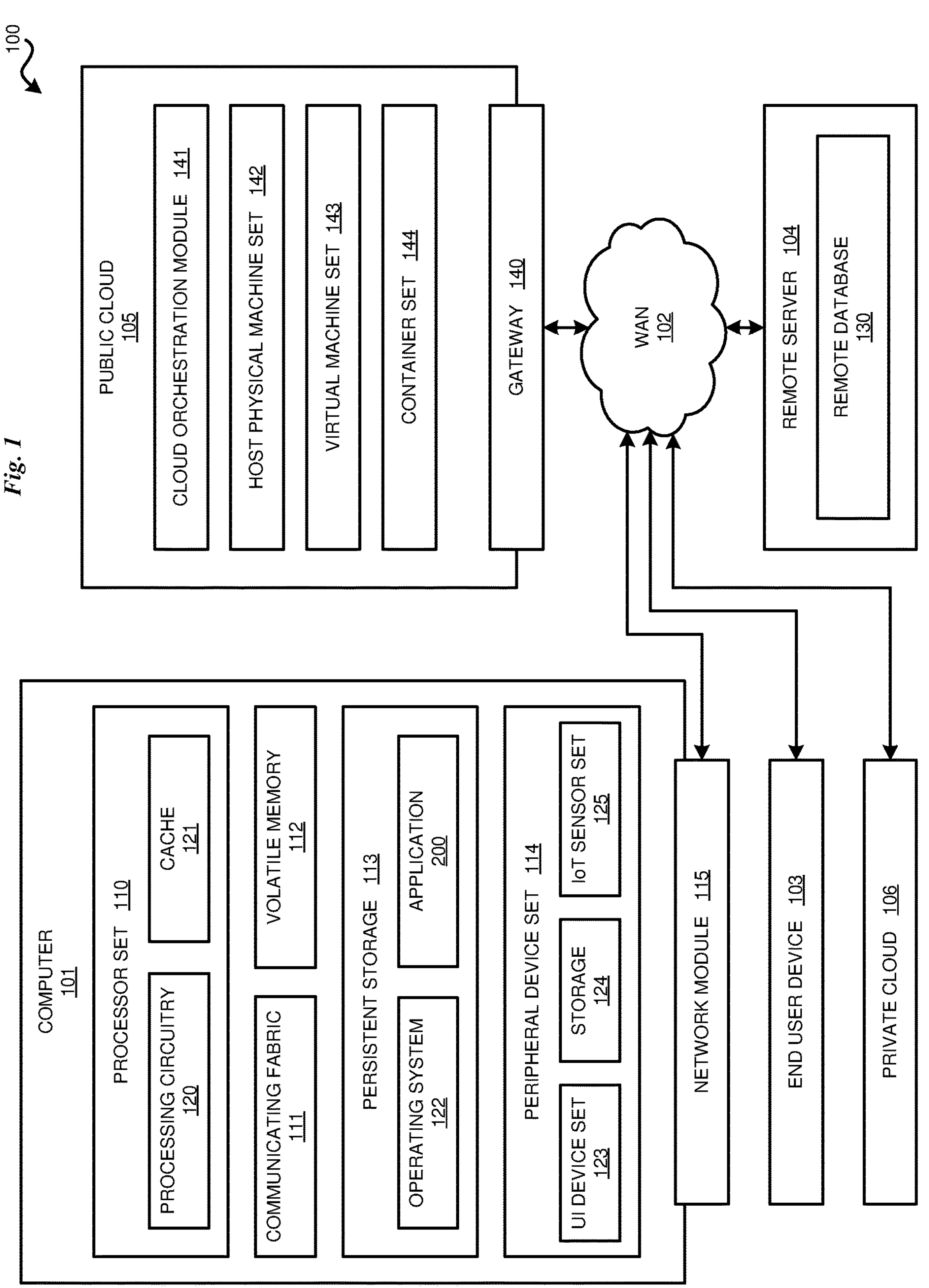
100
Fig. 1
PUBLIC CLOUD
105
CLOUD ORCHESTRATION MODULE 141
HOST PHYSICAL MACHINE SET 142
VIRTUAL MACHINE SET 143
CONTAINER SET 144
GATEWAY 140
WAN
102
REMOTE SERVER 104
REMOTE DATABASE
130
COMPUTER
101
PROCESSOR SET 110
PROCESSING CIRCUITRY
120
CACHE
121
COMMUNICATING FABRIC
111
VOLATILE MEMORY
112
PERSISTENT STORAGE 113
OPERATING SYSTEM
122
APPLICATION
200
PERIPHERAL DEVICE SET 114
UI DEVICE SET
123
STORAGE
124
IoT SENSOR SET
125
NETWORK MODULE 115
END USER DEVICE 103
PRIVATE CLOUD 106

Figure 2:
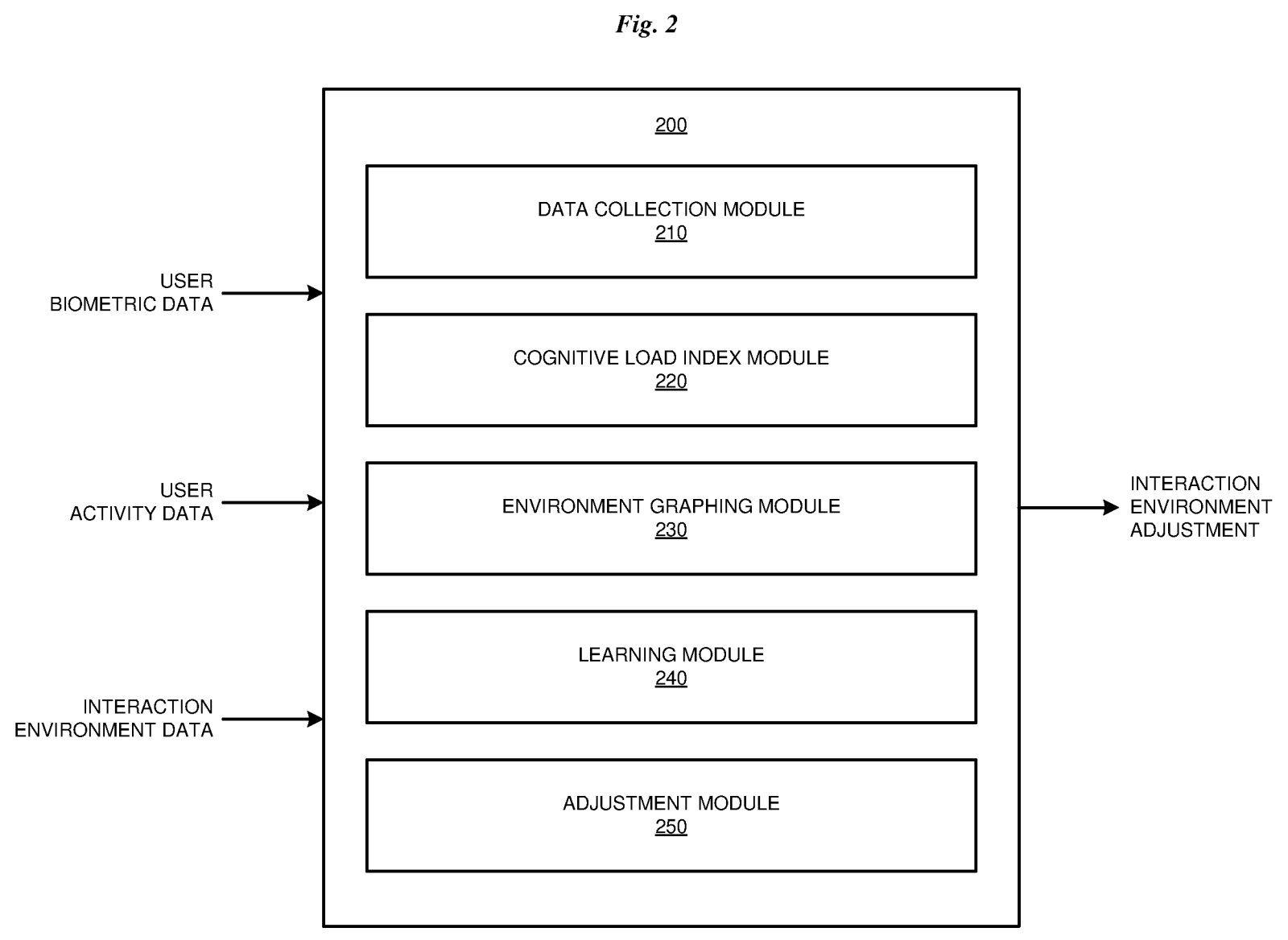

DATA COLLECTION MODULE 210

COGNITIVE LOAD INDEX MODULE 220

ENVIRONMENT GRAPHING MODULE 230

LEARNING MODULE 240

ADJUSTMENT MODULE 250

INTERACTION ENVIRONMENT ADJUSTMENT

USER BIOMETRIC DATA

USER ACTIVITY DATA

INTERACTION ENVIRONMENT DATA

*Fig. 3*

USER BIOMETRIC DATA 302

USER ACTIVITY DATA 304

INTERACTION ENVIRONMENT DATA 306

DATA COLLECTION MODULE 210

DATA 312

COGNITIVE LOAD INDEX MODULE 220

COGNITIVE LOAD INDEX 322

| CONDITION | RESULT |
|---|---|
| INCOMING MESSAGE NOTIFICATION > 1 /MINUTE | HIGH |
| CLASSICAL MUSIC, VOLUME < 60 DB | LOW |
| ROCK MUSIC, VOLUME > 80 DB | HAPPY |
| FLASHING LIGHTS > 10 /SECOND | DANGEROUS |

ENVIRONMENT GRAPHING MODULE 230

GRAPH 332

SHORT TERM MEMORY

INCOMING MESSAGE LOAD

ROCK MUSIC LOAD

MINIMIZING COGNITIVE OVERLOAD USING DYNAMIC INTERACTION ENVIRONMENT ADJUSTMENT

BACKGROUND

The present invention relates generally to a method, system, and computer program product for computer user experience adjustment. More particularly, the present invention relates to a method, system, and computer program product for minimizing cognitive overload using dynamic interaction environment adjustment.

In psychology, cognitive overload is a situation in which the demands placed on a person by mental work (the cognitive load) are greater than the person's mental abilities can cope with. Cognitive load includes the inherent difficulty of the information one is trying to learn and distracting or irrelevant information, as well as the load involved in the learning itself.

Cognitive load, and hence a risk of cognitive overload, is often caused by particular features of the user interface a user uses to interact with a computer system or other users. For example, a user who is easily distracted might prefer a user interface that minimizes distractions by suppressing all but the most urgent email notifications and appointment reminders. Similarly, a user who prefers calm environments might find it difficult to cope with a user interface that simulates a dance club environment including loud music, flashing lights, and many other users all talking at the same time. In contrast, another user might be most productive using a user interface that provides background music, or a particular type of background music, and find silence too distracting to function well. A user interface and its interaction features are referred to herein as an interaction environment.

SUMMARY

The illustrative embodiments provide a method, system, and computer program product. An embodiment includes a method that generates, from data of a first interaction environment, user activity data while using the first interaction environment, and user biometric data while using the first interaction environment, a first cognitive load index. An embodiment generates a first directed acyclic graph corresponding to the first cognitive load index. An embodiment generates, using a graph convolutional network, the first directed acyclic graph, and a second directed acyclic graph generated from a second cognitive load index, a set of cognitive overload causation factors. An embodiment adjusts, using the set of cognitive overload causation factors, the first interaction environment.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 1 depicts an example diagram of a data processing environments in which illustrative embodiments may be implemented;

FIG. 2 depicts a block diagram of an example configuration for minimizing cognitive overload using dynamic interaction environment adjustment in accordance with an illustrative embodiment;

FIG. 3 depicts an example of minimizing cognitive overload using dynamic interaction environment adjustment in accordance with an illustrative embodiment;

DETAILED DESCRIPTION

Figure 4:
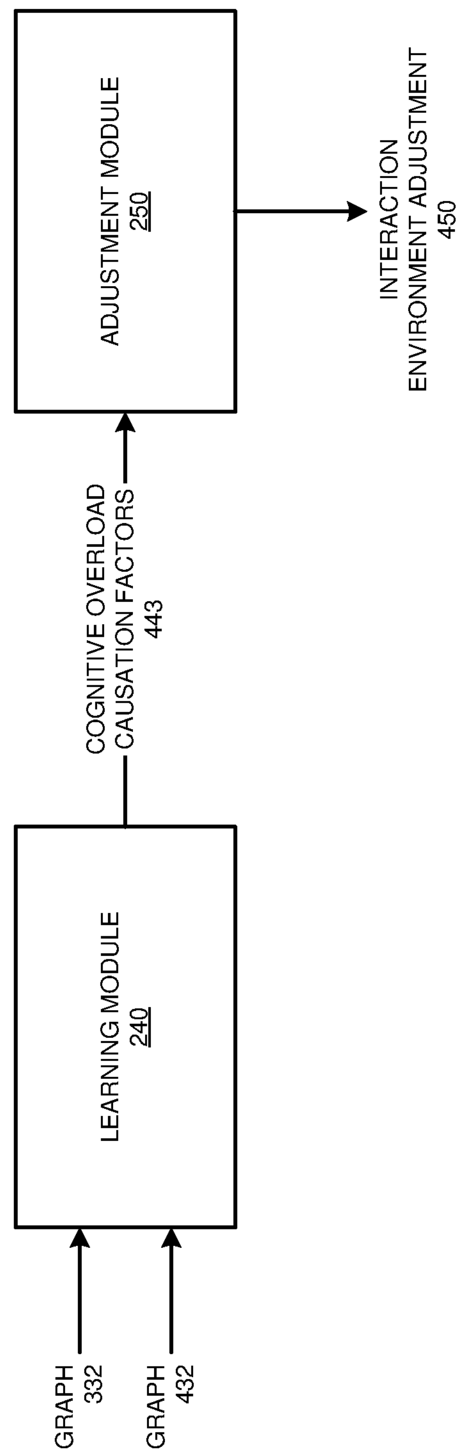
FIG. 4 depicts a continued example of minimizing cognitive overload using dynamic interaction environment adjustment in accordance with an illustrative embodiment.

The illustrative embodiments recognize that users prefer, and are most productive, an interaction environment adjusted to their particular needs and preferences. However, users may not be aware of the adjustments that would be most effective, or how to implement the adjustments in a particular interaction environment. In addition, it is inconvenient for users to make similar adjustments in each different interaction environment they use. Further, users' preferences can change with the time of day, how tired or healthy they are, and other factors and combinations of factors. For example, one user might be a morning person, and thus able to cope with more distractions in the morning than in the evening. Another user might have different visual acuity, and hence prefer a different font size, depending on the user's fatigue level. Thus, the illustrative embodiments recognize that there is a need to minimize cognitive overload by dynamically determining interaction features for a user of an interaction environment, based on the user's use of the same or a different environment, and adjusting those features automatically.

The illustrative embodiments recognize that the presently available tools or solutions do not address these needs or provide adequate solutions for these needs. The illustrative embodiments used to describe the invention generally address and solve the above-described problems and other problems related to minimizing cognitive overload using dynamic interaction environment adjustment.

An embodiment can be implemented as a software application. The application implementing an embodiment can be configured as a modification of an existing user interface management system, as a separate application that operates in conjunction with an existing user interface management system, a standalone application, or some combination thereof.

Particularly, some illustrative embodiments provide a method that generates, from user activity and biometric data and data of a first interaction environment, a first cognitive load index, generates a first directed acyclic graph corresponding to the first cognitive load index, generates, using a graph convolutional network, the first directed acyclic graph, and a second directed acyclic graph generated from a second cognitive load index, a set of cognitive overload causation factors, and adjusts, using the set of cognitive overload causation factors, the first interaction environment.

An embodiment receives data of an interaction environment. Another embodiment uses one or more presently available techniques to generate additional data of an interaction environment from the received data. For example, a presently available stream processing technique is usable to collect of activities within an interaction environment. One non-limiting example of data of a first interaction environment is data describing one or more aspects of the interaction environment, such as an appearance of the environment, audio portions of the environment (e.g., music or an alert), haptic portions of the environment (e.g., a vibration to signal an event), how event notifications are rendered (e.g., a banner, icon appearance change, alert tone, etc.), whether multi-tasking activities are provided in the interaction environment, whether there are other participants in the interaction environment and a distribution of the activities among the other participants, success or failure criteria for a particular activity performed within the interaction environment (e.g., response to an alert within a predetermined amount of time, completion of a level in a gaming environment, etc.), and the like. Data of a first interaction environment can be current or historical data, or a mixture of current and historical data.

An embodiment receives user activity data and biometric data of a user for which an interaction environment is to be adjusted. Another embodiment uses one or more presently available techniques, such as a stream processing technique, to generate additional user activity data from the received data. The biometric data is data of one or more of the user's biometric measurements, measured while the user is interacting with an element of the interaction environment. Some non-limiting examples of user biometric data are heart rate and oxygenation data, skin moisture data, eye movement data, body movement data, and the like. Biometric data is collected using one or more presently available sensors, such as a pulse oximeter, heartbeat sensor, moisture sensor, video camera, microphone, and the like. Some non-limiting examples of user activity data are a user's interactions, and interaction patterns, with an interaction environment, and changes in user's interaction pattern. An embodiment correlates user activity data with contemporaneous biometric data. For example, an increase in a user's heart rate, breathing rate, and skin moisture (from sweat)—all indicators of increased stress-might be correlated with playing of loud music in the interaction environment or a cluster of alerts the user does not respond to within a timely manner.

An embodiment generates, from user activity and biometric data and data of an interaction environment, a cognitive load index. The cognitive load index includes one or more entries. Each entry includes a particular condition or stimulus within an interactive environment, and a result of that condition or stimulus on the user. For example, some conditions within an interactive environment might be an incoming message notification rate greater than one per minute, classical music playing at a soft volume (e.g., 60 dB), rock music playing at a loud volume (e.g., 80 dB), lights flashing at a rate of more than ten flashes per second, and the like. In one embodiment, the result is binary—the user is in cognitive overload as a result of the condition, or the user is not in cognitive overload. In another embodiment, the result is continuous. To generate the cognitive load index, an embodiment generates an overload endurance limit.

An embodiment generates a directed acyclic graph (DAG) corresponding to the cognitive load index. A graph includes vertices, also called nodes, and edges connecting pairs of vertices. In a directed graph, each edge has an orientation or direction, from one vertex to another. A path in a directed graph is a sequence of edges in which the ending vertex of each edge in the sequence is the same as the starting vertex of the next edge in the sequence. A path forms a cycle if the starting vertex of the path's first edge equals the ending vertex of the path's last edge. A DAG is a directed graph that has no cycles. In the DAG, nodes represent a sequence of user actions and states that lead to cognitive overload and edge represents trigger events in the interaction environment. Thus, a DAG represents a user's reactions to aspects of an interaction environment, in graph form. To generate a DAG, an embodiment uses a continuous programming model with a weighted adjacency matrix (which gives edge weights of the DAG) and a score function that calculates the score of a DAG defined by the adjacency matrix. One non-limiting example of a DAG score function is a hill climbing algorithm, which is efficiently implemented for learning a DAG by optimizing a score. Another embodiment builds an ensemble of DAGs based on bootstrap resamples of the data.

An embodiment generates a second cognitive load index and a second DAG in a manner described herein. The second cognitive load index and DAG represent data of a user's use of the same interactive environment at a later time, data of the user's use of a different interactive environment, data of similar users' use of the same or a different interactive environment, or a combination. One embodiment periodically repeats the cognitive load index and DAG generation.

An embodiment uses a learning model to generate a set of cognitive overload causation factors from at least two DAGs. A cognitive overload causation factor is determined by multiple environments. In embodiments, the learning model includes one or more graph convolutional networks (GCNs) and recurrent neural networks (RNNs). A graph convolutional network is a convolutional artificial neural network that processes input data in the form of a graph. A recurrent neural network is an artificial neural network in which connections between neural network nodes can create a cycle, allowing output from some nodes to affect subsequent input to the same nodes. One embodiment converts each input graph to a matrix. Techniques to represent a graph with a matrix are presently known. One embodiment uses the GCN to identify similar elements in different matrices, thus identifying cognitive overload causation factors that are common to two interaction environments or two snapshots of the same interaction environment. The RNNs alter layer weights and update the adjacency matrix.

An embodiment uses the set of cognitive overload causation factors to adjust an interaction environment. One embodiment determines that a user is in, or near, cognitive overload and adjusts one or more aspects of the interaction environment (as determined by an overload causation factor) to attempt to reduce the user's cognitive load. Some non-limiting examples of interaction environment adjustments are altering a type of content presented (e.g., a text transcript and description instead of video), altering a characteristic of the content presented (e.g., the loudness), suppressing presentation of some content (e.g., suppressing some alerts or types of alerts), adjusting a content rendering interval to give a user more time to absorb previous content, and the like. Another embodiment adjusts an interaction environment by switching to a different interaction environment.

One embodiment uses a reinforcement learning process, a presently known technique, to further adjust the interaction environment based on the user's reactions to a first adjustment. For example, if one adjustment appears to reduce a user's cognitive load but not below a threshold, an embodiment might implement more of an adjustment (e.g., reducing music volume to a first level, then to a second, lower, level) or implement a different adjustment (e.g., reducing music volume to a first level, then silencing the music level altogether).

The manner of minimizing cognitive overload using dynamic interaction environment adjustment described herein is unavailable in the presently available methods in the technological field of endeavor pertaining to computer user interfaces. A method of an embodiment described herein, when implemented to execute on a device or data processing system, comprises substantial advancement of the functionality of that device or data processing system in generating, from user activity and biometric data and data of a first interaction environment, a first cognitive load index, generating a first directed acyclic graph corresponding to the first cognitive load index, generating, using a graph convolutional network, the first directed acyclic graph, and a second directed acyclic graph generated from a second cognitive load index, a set of cognitive overload causation factors, and adjusting, using the set of cognitive overload causation factors, the first interaction environment.

The illustrative embodiments are described with respect to certain types of interaction environments, contents, stimuli, causation factors, conditions, nodes, edges, graphs, GCNs, RNNs, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, except for limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to the figures and in particular with reference to FIG. 1, this figure is an example diagram of a data processing environments in which illustrative embodiments may be implemented. FIG. 1 is only an example and are not intended to assert or imply any limitation with regard to the environments in which different embodiments may be implemented. A particular implementation may make many modifications to the depicted environments based on the following description. FIG. 1 depicts a block diagram of a network of data processing systems in which illustrative embodiments may be implemented. Computing environment 100 contains an example of an environment for the execution of at least some of the computer code involved in performing the inventive methods, such as application 200. Application 200 implements a minimizing cognitive overload using dynamic interaction environment adjustment embodiment described herein. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144. Application 200 executes in any of computer 101, end user device 103, remote server 104, or a computer in public cloud 105 or private cloud 106 unless expressly disambiguated.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer

101 is not required to be in a cloud except to any extent as may be affirmatively indicated.

Processor set 110 includes one, or more, computer processors of any type now known or to be developed in the future. Processor set 110 may contain one or more processors and may be implemented using one or more heterogeneous processor systems. A processor in processor set 110 may be a single-or multi-core processor or a graphics processor. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Operating system 122 runs on computer 101. Operating system 122 coordinates and provides control of various components within computer 101. Instructions for operating system 122 are located on storage devices, such as persistent storage 113, and may be loaded into at least one of one or more memories, such as volatile memory 112. for execution by processor set 110.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of application 200 may be stored in persistent storage 113 and may be loaded into at least one of one or more memories, such as volatile memory 112, for execution by processor set 110. The processes of the illustrative embodiments may be performed by processor set 110 using computer implemented instructions, which may be located in a memory, such as, for example, volatile memory 112, persistent storage 113, or in one or more peripheral devices in peripheral device set 114. Furthermore, in one case, application 200 may be downloaded over WAN 102 from remote server 104 in response to a request, where similar code is stored on a storage device. In another case, application 200 may be downloaded over WAN 102 to remote server 104, where downloaded code is stored on a storage device.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in application 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, user interface (UI) device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. Internet of Things (IoT) sensor set 125 is made up of sensors that can be used in IoT applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

Wide area network (WAN) 102 is any WAN (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

With reference to FIG. 2, this figure depicts a block diagram of an example configuration for minimizing cognitive overload using dynamic interaction environment adjustment in accordance with an illustrative embodiment. Application 200 is the same as application 200 in FIG. 1.

Data collection module 210 receives data of an interaction environment. Another implementation of module 210 uses one or more presently available techniques, such as a stream processing technique, to generate additional data of an interaction environment from the received data. One non-limiting example of data of a first interaction environment is data describing one or more aspects of the interaction environment, such as an appearance of the environment, audio portions of the environment (e.g., music or an alert), haptic portions of the environment (e.g., a vibration to signal an event), how event notifications are rendered (e.g., a banner, icon appearance change, alert tone, etc.), whether multi-tasking activities are provided in the interaction environment, whether there are other participants in the interaction environment and a distribution of the activities among the other participants, success or failure criteria for a particular activity performed within the interaction environment (e.g., response to an alert within a predetermined amount of time, completion of a level in a gaming environment, etc.), and the like. Data of a first interaction environment can be current or historical data, or a mixture of current and historical data.

Data collection module 210 receives user activity data and biometric data of a user for which an interaction environment is to be adjusted. Another implementation of module 210 uses one or more presently available techniques, such as a stream processing technique, to generate additional user activity data from the received data. The biometric data is data of one or more of the user's biometric measurements, measured while the user is interacting with an element of the interaction environment. Some non-limiting examples of user biometric data are heart rate and oxygenation data, skin moisture data, eye movement data, body movement data, and the like. Biometric data is collected using one or more presently available sensors, such as a pulse oximeter, heartbeat sensor, moisture sensor, video camera, microphone, and the like. Some non-limiting examples of user activity data are a user's interactions, and interaction patterns, with an interaction environment, and changes in user's interaction pattern. Data collection module 210 correlates user activity data with contemporaneous biometric data. For example, an increase in a user's heart rate, breathing rate, and skin moisture (from sweat)—all indicators of increased stress-might be correlated with playing of loud music in the interaction environment or a cluster of alerts the user does not respond to within a timely manner.

Cognitive load index module 220 generates, from user activity and biometric data and data of an interaction environment, a cognitive load index. The cognitive load index includes one or more entries. Each entry includes a particular condition or stimulus within an interactive environment, and a result of that condition or stimulus on the user. For example, some conditions within an interactive environment might be an incoming message notification rate greater than one per minute, classical music playing at a soft volume (e.g., 60 dB), rock music playing at a loud volume (e.g., 80 dB), lights flashing at a rate of more than ten flashes per second, and the like. In one implementation of module 220, the result is binary—the user is in cognitive overload as a result of the condition, or the user is not in cognitive overload. In another implementation of module 220, the result is continuous To generate the cognitive load index, module 220 generates an overload endurance limit.

Environment graphing module 230 generates a DAG corresponding to the cognitive load index. In the DAG, nodes represent a sequence of user actions and states that lead to cognitive overload and edge represents trigger events in the interaction environment. Thus, a DAG represents a user's reactions to aspects of an interaction environment, in graph form. To generate a DAG, module 230 uses a continuous programming model with a weighted adjacency matrix (which gives edge weights of the DAG) and a score function that calculates the score of a DAG defined by the adjacency matrix. One non-limiting example of a DAG score function is a hill climbing algorithm, which is efficiently implemented for learning a DAG by optimizing a score. Another implementation of module 230 builds an ensemble of DAGs based on bootstrap resamples of the data.

Modules 220 and 230 generate a second cognitive load index and a second DAG in a manner described herein. The second cognitive load index and DAG represent data of a user's use of the same interactive environment at a later time, data of the user's use of a different interactive environment, data of similar users' use of the same or a different interactive environment, or a combination. One implementation of modules 220 and 230 periodically repeats the cognitive load index and DAG generation.

Learning module 240 uses a learning model to generate a set of cognitive overload causation factors from at least two DAGs. A cognitive overload causation factor is determined by multiple environments. In some implementations of module 240, the learning model includes one or more graph convolutional networks (GCNs) and recurrent neural networks (RNNs). One implementation of module 240 uses a presently available technique to convert each input graph to a matrix. One implementation of module 240 uses the GCN to identify similar elements in different matrices, thus identifying cognitive overload causation factors that are common to two interaction environments or two snapshots of the same interaction environment. The RNNs alter layer weights and update the adjacency matrix.

Adjustment module 250 uses the set of cognitive overload causation factors to adjust an interaction environment. One implementation of module 250 determines that a user is in, or near, cognitive overload and adjusts one or more aspects of the interaction environment (as determined by an overload causation factor) to attempt to reduce the user's cognitive load. Some non-limiting examples of interaction environment adjustments are altering a type of content presented (e.g., a text transcript and description instead of video), altering a characteristic of the content presented (e.g., the loudness), suppressing presentation of some content (e.g., suppressing some alerts or types of alerts), adjusting a content rendering interval to give a user more time to absorb previous content, and the like. Another implementation of module 250 adjusts an interaction environment by switching to a different interaction environment.

One implementation of module 250 uses a reinforcement learning process, a presently known technique, to further adjust the interaction environment based on the user's reactions to a first adjustment. For example, if one adjustment appears to reduce a user's cognitive load but not below a threshold, module 250 might implement more of an adjustment (e.g., reducing music volume to a first level, then to a second, lower, level) or implement a different adjustment (e.g., reducing music volume to a first level, then silencing the music level altogether).

With reference to FIG. 3, this figure depicts an example of minimizing cognitive overload using dynamic interaction environment adjustment in accordance with an illustrative embodiment. The example can be executed using application 200 in FIG. 2. Data collection module 210, cognitive load index module 220, and environment graphing module 230 are the same as data collection module 210, cognitive load index module 220, and environment graphing module 230 in FIG. 2.

Data collection module 210 receives user biometric data 302, user activity data 304, and interaction environment 306, and generates data 312. Data 312 includes user biometric data 302, user activity data 304, and interaction environment 306, as well as data derived from user biometric data 302, user activity data 304, and interaction environment 306.

Cognitive load index module 220 generates, from data 312, cognitive load index 322. Cognitive load index 322 includes one or more entries. Each entry includes a particular condition or stimulus within an interactive environment, and a result of that condition or stimulus on the user.

Environment graphing module 230 generates graph 332 corresponding to cognitive load index 322. In graph 332, a node represents a user action and an edge represents a trigger event, in the interaction environment, resulting in the user action. Thus, graph 332 represents a user's reactions to aspects of an interaction environment, in graph form.

With reference to FIG. 4, this figure depicts a continued example of minimizing cognitive overload using dynamic interaction environment adjustment in accordance with an illustrative embodiment. Learning module 240 and adjustment module 250 are the same as learning module 240 and adjustment module 250 in FIG. 2. Graph 332 is the same as graph 332 in FIG. 3.

Modules 220 and 230 generate a second cognitive load index (not depicted) and graph 432 in a manner described herein. Learning module 240 uses a learning model to generate cognitive overload causation factors 443 from graphs 332 and 432. Adjustment module 250 uses cognitive overload causation factors 443 to generate interaction environment adjustment 450.

Figure 5:
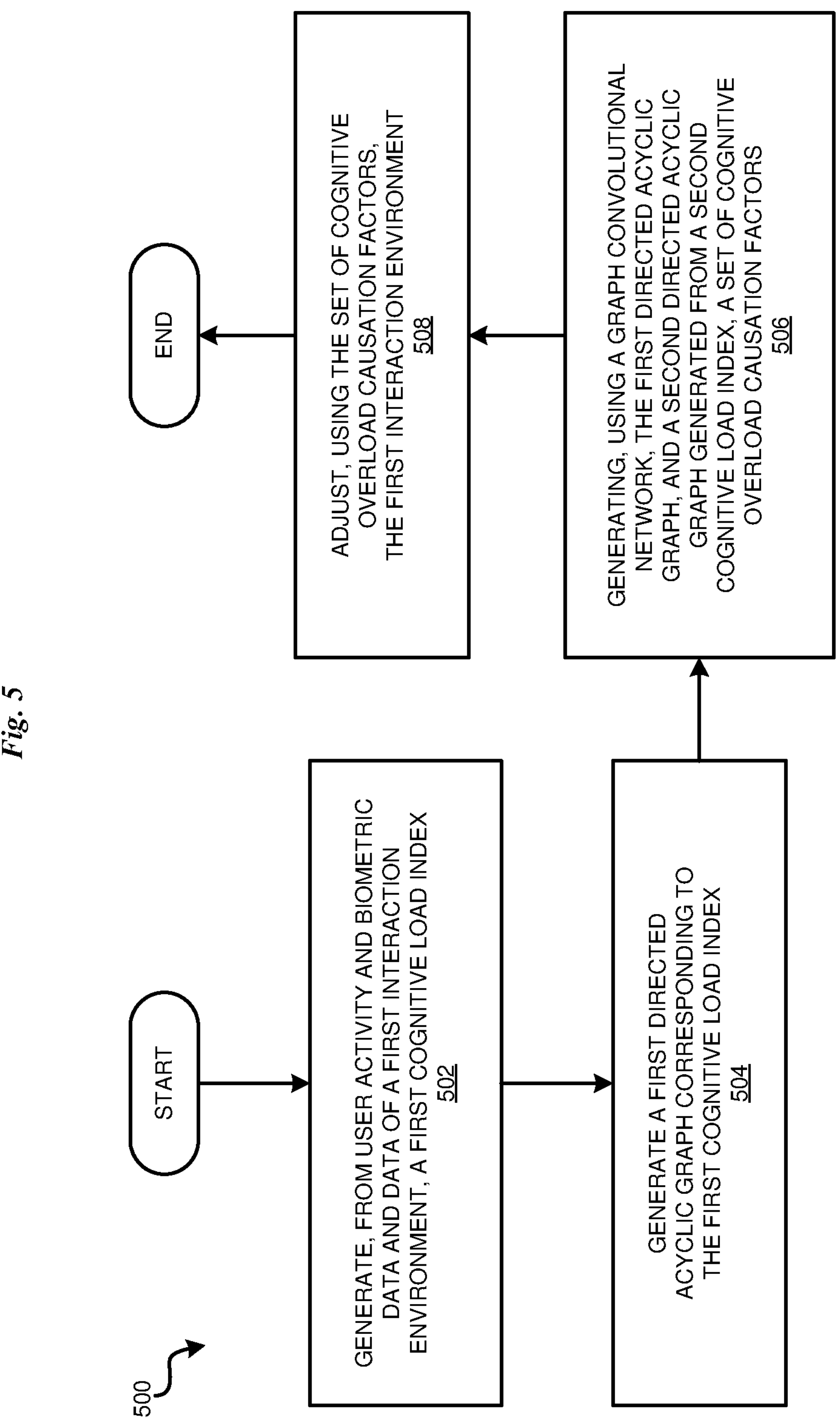
FIG. 5 depicts a flowchart of an example process for minimizing cognitive overload using dynamic interaction environment adjustment in accordance with an illustrative embodiment.

With reference to FIG. 5, this figure depicts a flowchart of an example process for minimizing cognitive overload using dynamic interaction environment adjustment in accordance with an illustrative embodiment. Process 500 can be implemented in application 200 in FIG. 2.

In block 502, the application generates, from user activity and biometric data and data of a first interaction environment, a first cognitive load index. In block 504, the application generates a first directed acyclic graph corresponding to the first cognitive load index. In block 506, the application generates, using a graph convolutional network, the first directed acyclic graph, and a second directed acyclic graph generated from a second cognitive load index, a set of cognitive overload causation factors. In block 508, the application adjusts, using the set of cognitive overload causation factors, the first interaction environment. Then the application ends.

Thus, a computer implemented method, system or apparatus, and computer program product are provided in the illustrative embodiments for minimizing cognitive overload using dynamic interaction environment adjustment and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

What is claimed is:

1. A computer-implemented method comprising:

generating, from data of a first interaction environment, user activity data while using the first interaction environment, and user biometric data while using the first interaction environment, a first cognitive load index;

generating a first directed acyclic graph corresponding to the first cognitive load index;

generating, using a graph convolutional network, the first directed acyclic graph, and a second directed acyclic graph generated from a second cognitive load index, a set of cognitive overload causation factors; and adjusting, using the set of cognitive overload causation factors, the first interaction environment.

2. The computer-implemented method of claim 1, wherein the cognitive load index comprises a plurality of entries, each entry comprising a condition within the interactive environment, and a result of the condition.

3. The computer-implemented method of claim 1, wherein adjusting, using the set of cognitive overload causation factors, the first interaction environment comprises altering a type of a content presented in the interaction environment.

4. The computer-implemented method of claim 1, wherein adjusting, using the set of cognitive overload causation factors, the first interaction environment comprises altering a characteristic of a content presented in the interaction environment.

5. The computer-implemented method of claim 1, wherein adjusting, using the set of cognitive overload causation factors, the first interaction environment comprises suppressing presentation of a content in the interaction environment.

6. The computer-implemented method of claim 1, wherein adjusting, using the set of cognitive overload causation factors, the first interaction environment comprises altering a rendering interval of a content presented in the interaction environment.

7. A computer program product comprising one or more computer readable storage medium, and program instructions collectively stored on the one or more computer readable storage medium, the program instructions executable by a processor to cause the processor to perform operations comprising:

generating, from data of a first interaction environment, user activity data while using the first interaction environment, and user biometric data while using the first interaction environment, a first cognitive load index;

generating a first directed acyclic graph corresponding to the first cognitive load index;

generating, using a graph convolutional network, the first directed acyclic graph, and a second directed acyclic graph generated from a second cognitive load index, a set of cognitive overload causation factors; and adjusting, using the set of cognitive overload causation factors, the first interaction environment.

8. The computer program product of claim 7, wherein the stored program instructions are stored in a computer readable storage device in a data processing system, and wherein the stored program instructions are transferred over a network from a remote data processing system.

9. The computer program product of claim 7, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

10. The computer program product of claim 7, wherein the cognitive load index comprises a plurality of entries, each entry comprising a condition within the interactive environment, and a result of the condition.

11. The computer program product of claim 7, wherein adjusting, using the set of cognitive overload causation factors, the first interaction environment comprises altering a type of a content presented in the interaction environment.

12. The computer program product of claim 7, wherein adjusting, using the set of cognitive overload causation factors, the first interaction environment comprises altering a characteristic of a content presented in the interaction environment.

13. The computer program product of claim 7, wherein adjusting, using the set of cognitive overload causation factors, the first interaction environment comprises suppressing presentation of a content in the interaction environment.

14. The computer program product of claim 7, wherein adjusting, using the set of cognitive overload causation factors, the first interaction environment comprises altering a rendering interval of a content presented in the interaction environment.

15. A computer system comprising a processor and one or more computer readable storage media, and program instructions collectively stored on the one or more computer readable storage media, the program instructions executable by the processor to cause the processor to perform operations comprising:

generating, from data of a first interaction environment, user activity data while using the first interaction environment, and user biometric data while using the first interaction environment, a first cognitive load index;

generating a first directed acyclic graph corresponding to the first cognitive load index;

generating, using a graph convolutional network, the first directed acyclic graph, and a second directed acyclic graph generated from a second cognitive load index, a set of cognitive overload causation factors; and adjusting, using the set of cognitive overload causation factors, the first interaction environment.

16. The computer system of claim 15, wherein the cognitive load index comprises a plurality of entries, each entry comprising a condition within the interactive environment, and a result of the condition.

17. The computer system of claim 15, wherein adjusting, using the set of cognitive overload causation factors, the first interaction environment comprises altering a type of a content presented in the interaction environment.

18. The computer system of claim 15, wherein adjusting, using the set of cognitive overload causation factors, the first interaction environment comprises altering a characteristic of a content presented in the interaction environment.

19. The computer system of claim 15, wherein adjusting, using the set of cognitive overload causation factors, the first interaction environment comprises suppressing presentation of a content in the interaction environment.

20. The computer system of claim 15, wherein adjusting, using the set of cognitive overload causation factors, the first interaction environment comprises altering a rendering interval of a content presented in the interaction environment.

* * * * *